(12) United States Patent
Lin

(10) Patent No.: US 7,961,062 B2
(45) Date of Patent: Jun. 14, 2011

(54) AGGRESSOR/VICTIM TRANSMISSION LINE PAIR HAVING SPACED TIME DELAY MODULES FOR PROVIDING CROSS-TALK REDUCTION

(75) Inventor: Yu-Hsu Lin, San Jose, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 119 days.

(21) Appl. No.: 12/346,825

(22) Filed: Dec. 30, 2008

(65) Prior Publication Data

US 2010/0001806 A1    Jan. 7, 2010

(30) Foreign Application Priority Data

Jul. 4, 2008   (CN) .......................... 2008 1 0302553

(51) Int. Cl.
*H01P 3/02* (2006.01)

(52) U.S. Cl. ............................................. 333/1; 333/12

(58) Field of Classification Search .................. 333/1, 4, 333/5, 12
See application file for complete search history.

(56) References Cited

U.S. PATENT DOCUMENTS

| | | | |
|---|---|---|---|
| 6,496,081 B1 * | 12/2002 | Govind et al. | ............... 333/28 R |
| 6,665,845 B1 | 12/2003 | Aingaran et al. | |
| 6,940,362 B2 * | 9/2005 | Otaki et al. | ...................... 333/33 |
| 7,369,020 B2 * | 5/2008 | Kanno et al. | ................... 333/238 |
| 7,405,634 B2 * | 7/2008 | Mobley et al. | ..................... 333/1 |
| 2007/0089072 A1 | 4/2007 | Lin et al. | |
| 2007/0236303 A1 * | 10/2007 | Lee et al. | ........................... 333/1 |

* cited by examiner

*Primary Examiner* — Benny Lee
(74) *Attorney, Agent, or Firm* — Clifford O. Chi

(57) ABSTRACT

A pair of signal transmission lines includes an aggressor line and a victim line parallel to the aggressor line. A plurality of time delay modules is linked in the aggressor line. A plurality of time delay modules is linked in the victim line. A total delay time of the time delay modules of the victim line is equal to a total delay time of the time delay modules of the aggressor line.

5 Claims, 6 Drawing Sheets

AGGRESSOR/VICTIM TRANSMISSION LINE PAIR HAVING SPACED TIME DELAY MODULES FOR PROVIDING CROSS-TALK REDUCTION

BACKGROUND

Relevant subject matter is disclosed in abandoned U.S. patent application (application Ser. No. 11/309,537; Pub. No. 2007/0089072A1; filed on Aug. 18, 2006 and entitled "SIGNAL TRANSMISSION STRUCTURE", which is assigned to the same assignee as this patent application.

1. Technical Field

The present disclosure relates to techniques of transmitting electrical signals, and particularly to a signal transmission lines that can reduce crosstalk.

2. Description of Related Art

Mutual capacitance is the coupling of two electric fields, where electrical current proportional to the rate of change of voltage in a driver flows into a target line. The shorter the distance between two electrically conductive objects, the greater is their mutual capacitance. Similarly, if two conductors are brought into close proximity so that the magnetic field of one conductor interacts with the magnetic field of the other conductor, a voltage is generated in the second conductor. This is called mutual inductance.

Crosstalk is the electrical "noise" caused by mutual inductance and mutual capacitance between signal conductors, due to their close proximity to each other. Crosstalk can cause digital system failure due to false signals appearing on a receiver.

What is needed, therefore, are signal transmission lines that can reduce crosstalk.

DETAILED DESCRIPTION OF THE EMBODIMENTS

Figure 1:
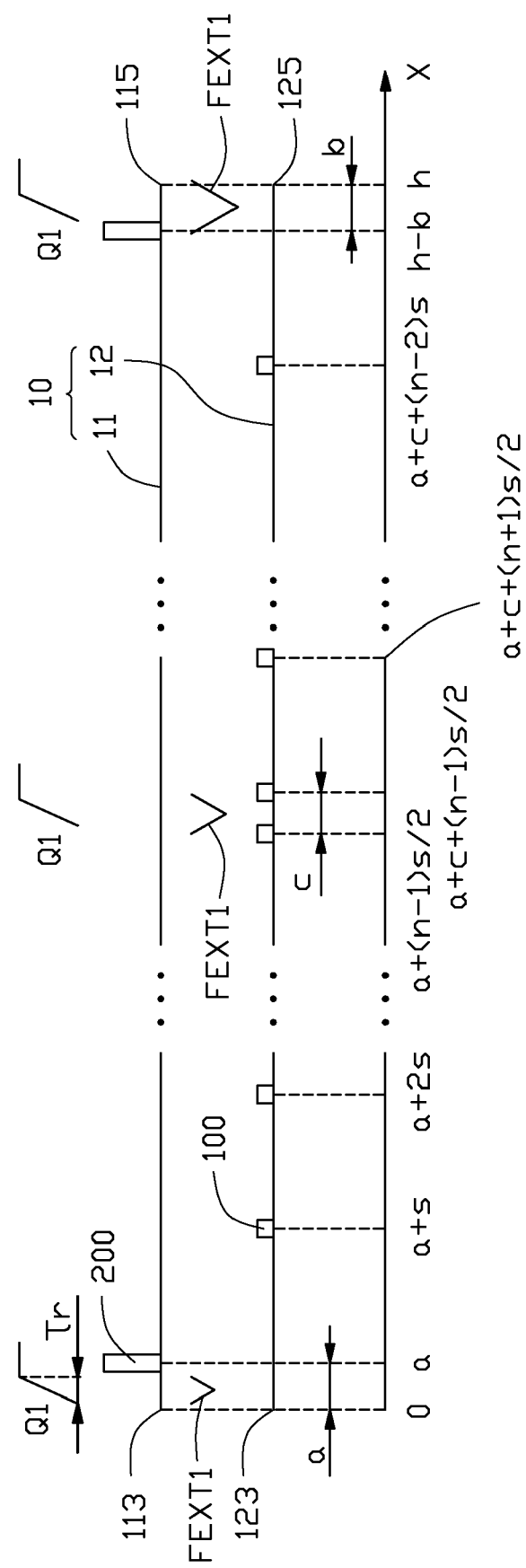
FIG. 1 is a sketch view of a first embodiment of signal transmission lines.

Referring to FIG. 1, a pair of a first embodiment of signal transmission lines 10 includes an aggressor line 11 and a victim line 12, each length of which is h. A mutual inductance between the two transmission lines is $L_m$. An inductance of each transmission line is L. A mutual capacitance between the two transmission lines is $C_m$. A capacitance of each transmission line is C. A rise time of a signal Q1 transmitted on the aggressor line 11 is $\tau_r$. A transmitting time of the signal Q1 transmitted on the aggressor line 11 is $T_{pd}$. The formula used to estimate crosstalk FEXT is: $FEXT[\%] = -T_{pd}/2\tau_r \times (L_m/L - C_m/C)$. From the formula, it is apparent that the crosstalk FEXT becomes large when the transmitting time $T_{pd}$ increases.

The aggressor line 11 includes a first end 113 and a second end 115. The victim line 12 includes a first end 123 in alignment with the first end 113 of the aggressor line 11, and a second end 125 in alignment with the second end 115 of the aggressor line 11. The aggressor line 11 is placed parallel to a one dimension coordinate axis X with the first end 113 in alignment with a zero point of the coordinate axis X. A coordinate value of the second end 115 is h. The coordinate value h is divided by a number n to get a value s, wherein n is an odd number equal to or larger than three. Three non-negative values a, b, and c, are chosen that satisfy the following equation: a+b+c=s. Each of the different positions, whose coordinate values are a+s, a+2s ... a+0.5*(n−1)*s, a+c+0.5*(n−1)*s, a+c+0.5*(n+1)*s ... a+c+(n−2)*s, of the victim line 12 is linked with a first time delay module 100, whose delay time is $\tau_d$. The delay time $\tau_d$ is equal to or larger than half of the rise time $\tau_r$. There are (n−1) ones first time delay modules on the victim line 12 with a total delay time of $(n-1)*\tau_d$. Each of the different positions, whose coordinate values are a and h−b, of the aggressor line 11 is linked with a second time delay module 200, whose delay time is $0.5*(n-1)*\tau_d$. There are two second time delay modules on the aggressor line 11, with total delay time of $(n-1)*\tau_d$, which is equal to the total delay time of the victim line 12.

When the signal Q1 starts to be transmitted on the aggressor line 11 from the first end 113 of the aggressor line 11, a corresponding crosstalk signal FEXT1 is generated on the first end 123 of the victim line 12. The signals Q1 and FEXT1 are synchronously transmitted forward along a path of transmission. The signal FEXT1 becomes larger under the influence of the signal Q1 as the signals Q1 and FEXT1 progress along the path. When the signals Q1 and FEXT1 are transmitted to a position of coordinate value a, the signal Q1 is delayed by a second delay module 200, and signal FEXT1 continues along the path. Thus, the signals Q1 and FEXT1 are transmitted asynchronously. The signal Q1 no longer influences FEXT1, and FEXT1 does not become larger as it progresses along the path. When FEXT1 reaches the position at coordinate value a+(n−1)*s/2, the signal FEXT1 is delayed by (n−1)/2 first delay modules 100, whose total delay time is $(n-1)*\tau_d/2$. Then, the signals Q1 is delayed by one second delay module 200, whose delay time is $(n-1)*\tau_d/2$. At this position, the signals Q1 and FEXT1 are delayed by a same time, and transmitted in a same longitudinal distance, so that the two signals Q1 and FEXT1 are synchronous again. Thus, the signal Q1 influences the signal FEXT1, and the signal FEXT1 becomes large after leaving the position at coordinate value a+(n−1)*s/2.

When the signals Q1 and FEXT1 reach a position at coordinate value a+c+(n−1)*s/2, FEXT1 is delayed by a first delay module 100, and Q1 continues along the path. Thereby, Q1 and FEXT1 are asynchronous again. Q1 no longer influences FEXT1, and FEXT1 does not become larger as it progresses along the path. When FEXT1 reaches the position at coordinate value h−b, it is delayed a total of $(n-1)*\tau_d$ by (n−1) first delay modules 100. Then, Q1 is delayed a total of $(n-1)*\tau_d$ by two second delay modules 200. At this position, the signals Q1 and FEXT1 are delayed by a same time, and transmitted in a same longitudinal distance, so the two signals Q1 and FEXT1 are synchronous again. Thus, Q1 influences FEXT1, and FEXT1 grows larger as it continues on from the position at coordinate h−b until Q1 and FEXT1 are output from the aggressor line 11 and victim line 12.

The value of the signal FEXT1 is: $FEXT1[\%] = -T_{(a+b+c)}/2\tau_r \times (L_m/L - C_m/C)$. In the above equation, $T_{(a+b+c)}$ is a time of the signal FEXT1, transmitting a distance a+b+c. Since the distance a+b+c is equal to s, which is also equal to h/n, the crosstalk by adding delay modules 100, 102 is only 1/n that of conventional transmission lines.

Figure 2:
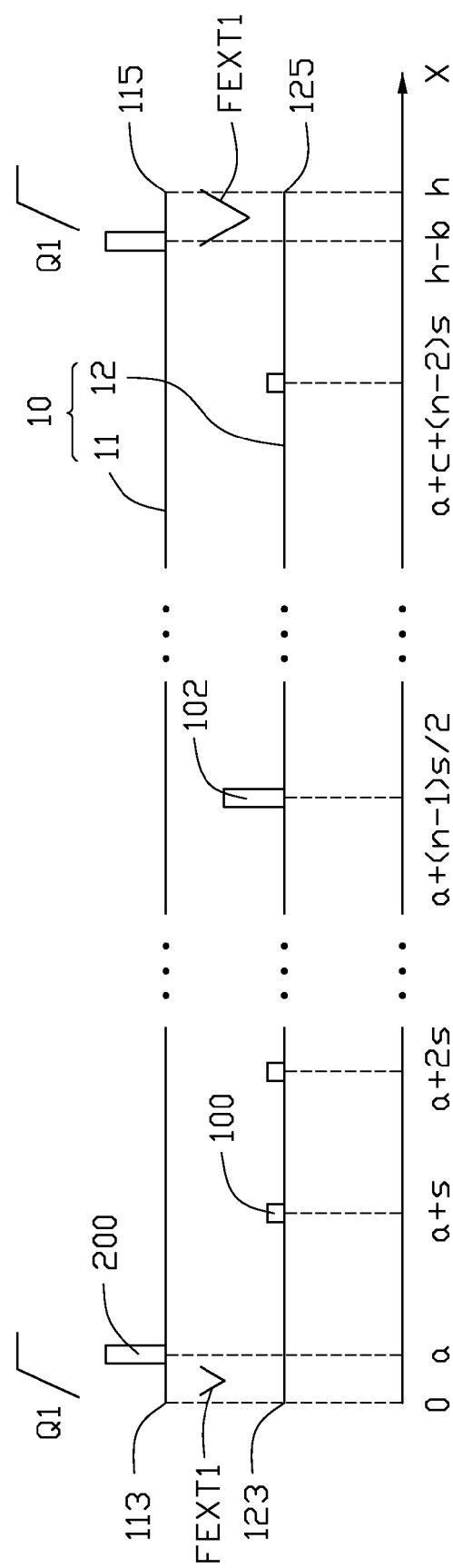
FIG. 2 is a sketch view of a particular case of the signal transmission lines of FIG. 1.

Referring to FIG. 2, a particular case of the signal transmission lines of FIG. 1 is shown, in which the c in the equation of "a+b+c=s" is equal to 0. In FIG. 2, the signal transmission lines 10 include the aggressor line 11 and the victim line 12 of FIG. 1. The aggressor line 11 includes the first end 113 and a second end 115 as that in FIG. 1. The victim line 12 includes the first end 123 and the second end 125 as that in FIG. 1. When c is equal to 0, the positions at coordinate values of a+(n−1)*s/2, and a+c+(n−1)*s/2 of FIG. 1 are superposed in FIG. 2. Each of the different positions, whose coordinate values are a+s, a+2s . . . a+(n−1)*s/2 . . . a+c+(n−2)*s, of the victim line 12 of the signal transmission lines 10 is linked with a first time delay module 100 or a fifth delay module 102, where the position at coordinate a+(n−1)*s/2 is linked with the fifth time delay module 102, and each of the other positions are linked with a first time delay module 100. A delay time of the fifth delay module 102 is double the delay time of the first delay module 100 of FIG. 1. Each of the different positions, whose coordinate values are a and h−b, of the aggressor line 11 is linked with a second time delay module 200 of FIG. 1. In FIG. 2, the signal Q1 also transmits on the aggressor line 11, and the crosstalk signal FEXT1 is also generated on the victim line 12.

Figure 3:
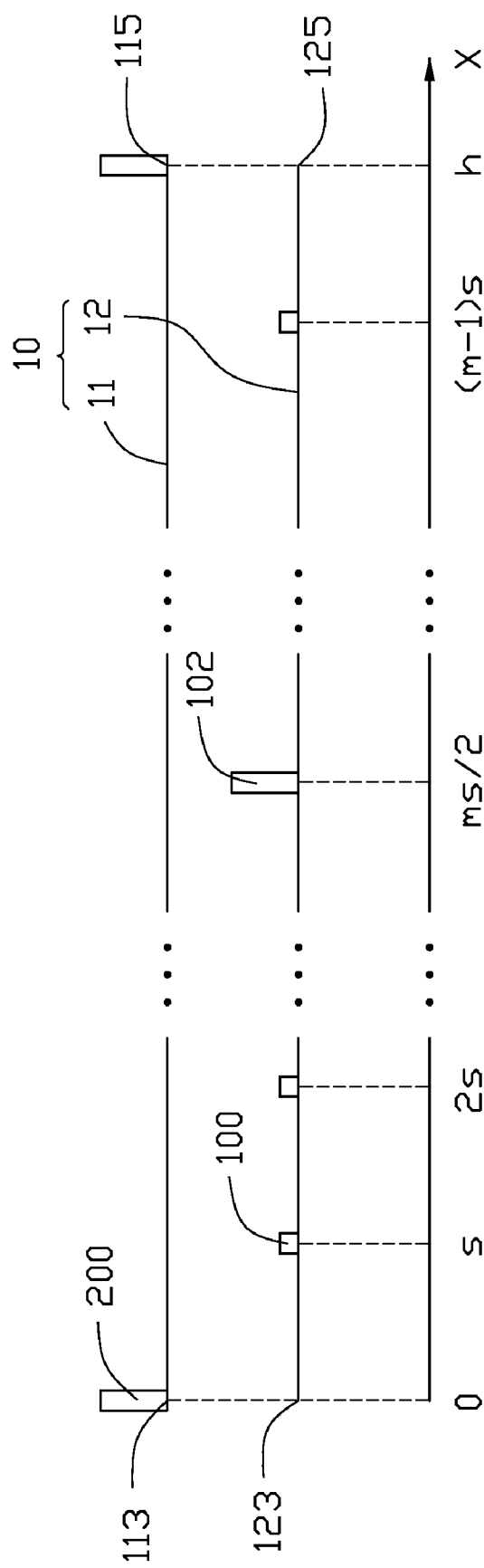
FIG. 3 is a sketch view of another particular case of the signal transmission lines of FIG. 1.

Referring to FIG. 3, another particular case of the signal transmission lines of FIG. 1 is shown, in which the values a, b, and c in the equation of "a+b+c=s" are each equal to 0. In FIG. 3. the signal transmission lines 10 include the aggressor line 11 and the victim line 12 of FIG. 1. The aggressor line 11 includes the first end 113 and a second end 115 as that in FIG. 1. The victim line 12 includes the first end 123 and the second end 125 as that in FIG. 1. The length of the victim line 12 of the signal transmission lines 10 is divided into m parts by the first delay module 100 and fifth delay module 102, in which m is equal to n−1. Each of the different positions, whose coordinate values are s, 2s . . . (m−1)*s, of the victim line 12 are linked with first time delay modules 100 or fifth time delay modules 102, where the position at coordinate m*s/2 is linked with a fifth time delay module 102, and each of the other positions is linked with a first time delay module 100. Each of the two positions of the aggressor line 11, whose coordinates are 0 and h, is linked with a second time delay module 200. Therefore, the crosstalk is $-T_{h/m}/2\tau_r \times (L_m/L - C_m/C)$, which is only 1/m that of conventional transmission lines.

Figure 4:
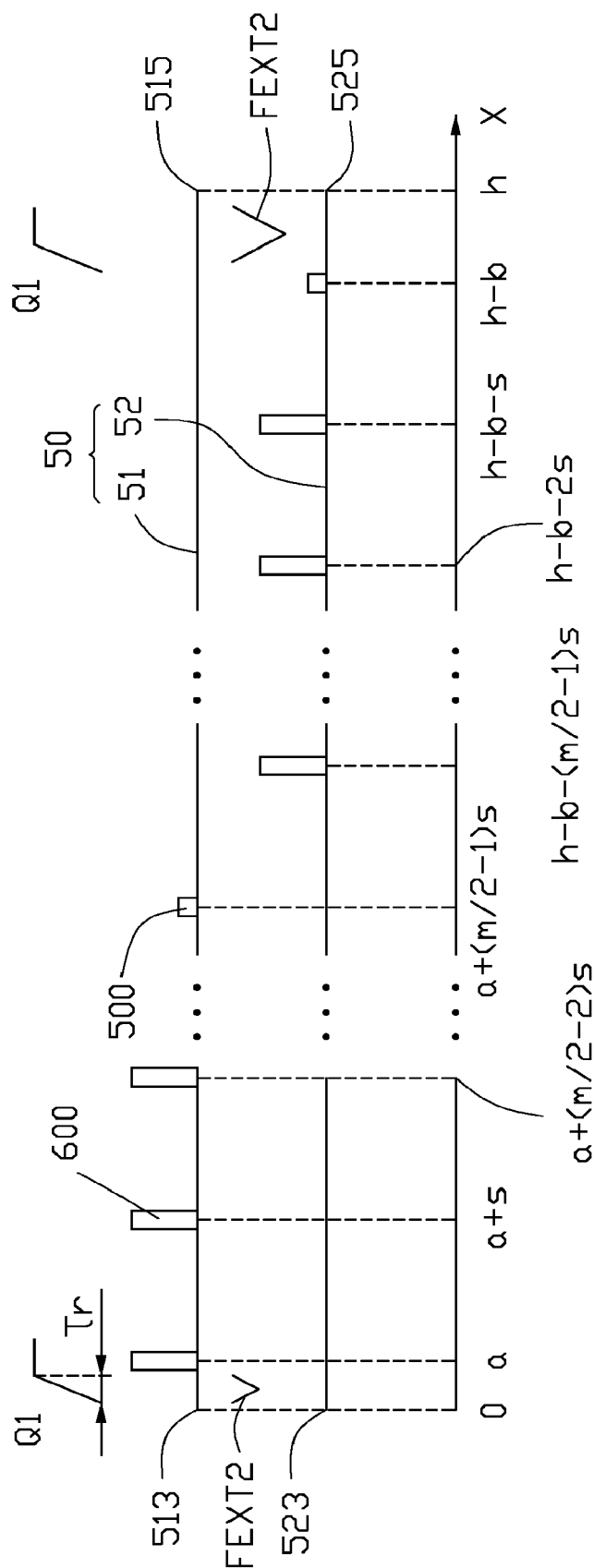
FIG. 4 is a sketch view of a second embodiment of signal transmission lines.

Referring to FIG. 4, a pair of a second embodiment of transmission lines 50 includes an aggressor line 51 and a victim line 52, of equal length h.

The aggressor line 51 includes a first end 513 and a second end 515. The victim line 52 includes a first end 523 in alignment with the first end 513 of the aggressor line 51, and a second end 525 in alignment with the second end 515 of the aggressor line 51. The first end 513 of the aggressor line 51 is in alignment with the zero point (labeled as "0") of the one dimension coordinate axis X. The signal Q1 is transmitted on the aggressor line 51. A rise time of a signal Q1 transmitted on the aggressor line 51 is τr. A coordinate of the second end 515 is h. The value h is divided by a number m to get a value s, where m is an even number equal to or greater than two. Two non-negative values, a and b, are chosen that satisfy the following equation: a+b=s.

Each of the different positions at coordinates a, a+s . . . a+(m/2−2)*s, a+(m/2−1)*s, of the aggressor line 51 are linked with one of a plurality of third time delay modules 500 or one of a plurality of fourth time delay modules 600, where the position at coordinate a+(m/2−1)*s is linked with a third time delay module 500, and each of other positions is linked with a fourth time delay module 600. A delay time of each of the third time delay modules 500 is $\tau_d$, which is equal to or larger than $\tau_r/2$, and a delay time of each of the fourth time delay modules 600 is $2*\tau_d$.

Each of the different positions, whose coordinate are h−b, h−b−s, h−b−2s . . . h−b−(m/2−1)*s, of the victim line 52 are linked with a third time delay module 500 or a fourth time delay module 600, where the position at coordinate h−b is linked with a third time delay module 500, and each of other positions is linked with a fourth time delay module 600. The total delay time of the time delay modules linked in aggressor line 51 is equal to that of the victim line 52.

In the signal transmission lines 50, the crosstalk signal FEXT2 is: $FEXT2 = -T_{(a+b)}/2\tau_r \times (L_m/L - C_m/C)$, where $T_{(a+b)}$ is a time of the crosstalk signal FEXT2 transmitting a distance of a+b. Since the distance of a+b is equal to s, which is also equal to h/m, the crosstalk of the signal transmission lines 50 of FIG. 4, by adding delay modules is only 1/m part of conventional transmission lines.

Figure 5:
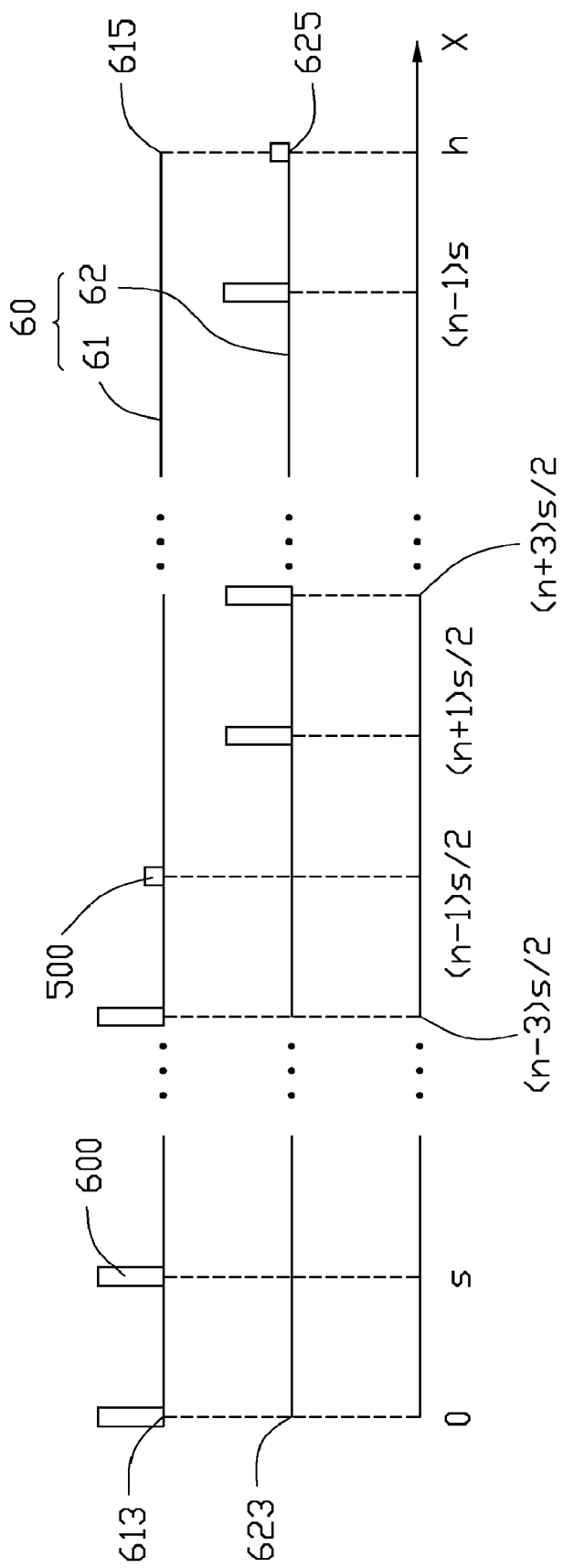
FIG. 5 is a sketch view of a third embodiment of signal transmission lines.

Referring to FIG. 5, a pair of a third embodiment of signal transmission lines 60 includes an aggressor line 61 and a victim line 62, each with a length h. The aggressor line 61 includes a first end 613 and a second end 615. The victim line 62 includes a first end 623 in alignment with the first end 613 of the aggressor line 61, and a second end 625 in alignment with the second end 615 of the aggressor line 61. The first end 613 of the aggressor line 61 is in alignment with the zero point of the one dimension coordinate axis X. A coordinate value of the second end 615 is h. The length h of the aggressor line 61 (or victim line 62) is divided by a number n to get a value s, where n is an odd number which is equal to or larger than three.

Each of the different positions, whose coordinates are (n+1)*s/2, (n+3)*s/2 . . . (n−1)*s, h, of the victim line 62 is linked with a third time delay module 500 or a fourth time delay module 600, where the position at coordinate h is linked with a third time delay module 500, and each of other positions is linked with a fourth time delay modules 600.

Each of the different positions, whose coordinates are 0, s . . . (n−3)*s/2, (n−1)*s/2, of the aggressor line 61 is linked with a third time delay module 500 or a fourth time delay module 600, where the position at coordinate (n−1)*s/2 is linked with a third time delay module 500, and each of other positions is linked with a fourth time delay module 600. The total delay time of the time delay modules linked with the aggressor line 61 is equal to that of the victim line 62.

In the signal transmission lines 60 of FIG. 5, a value of the crosstalk signal is $-T_{(h/n)}/2\tau_r \times (L_m/L - C_m/C)$, where $T_{(h/n)}$ is a time of the crosstalk signal transmitting a distance of h/n, so the crosstalk of the signal transmission lines 60 of FIG. 5 by adding delay modules is only 1/n that of conventional transmission lines.

Figure 6:
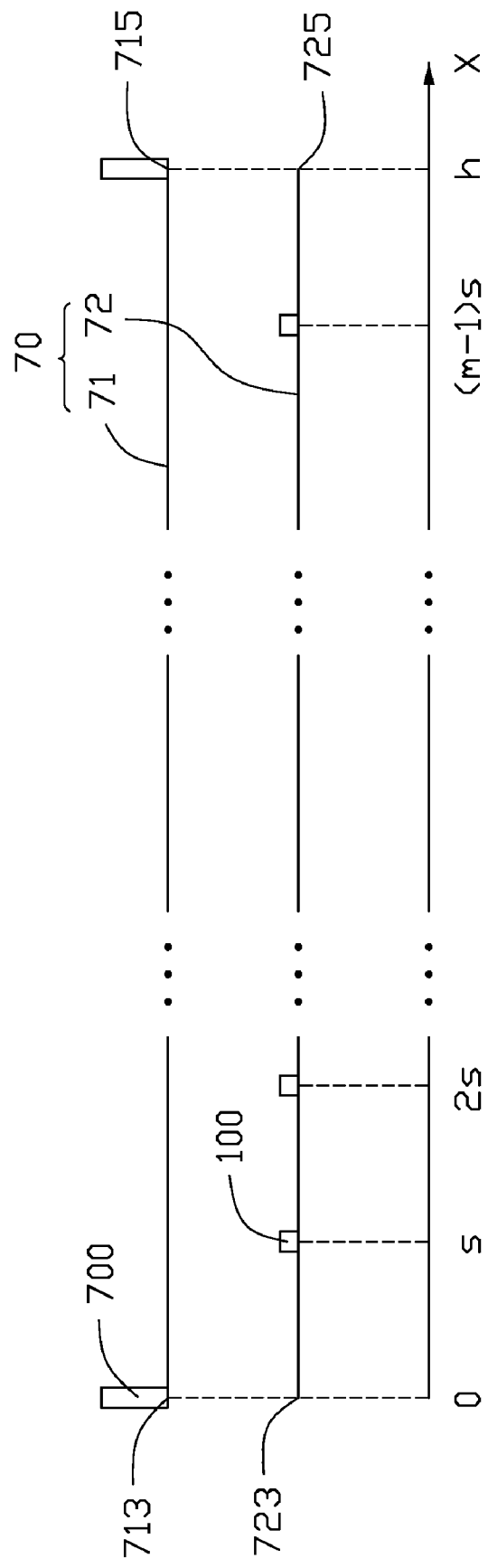
FIG. 6 is a sketch view of a fourth embodiment of signal transmission lines.

Referring to FIG. 6, a pair of a third embodiment of transmission lines 70 includes an aggressor line 71 and a victim line 72, each having a length of h.

The aggressor line 71 includes a first end 713 and a second end 715. The victim line 72 includes a first end 723 in alignment with the first end 713 of the aggressor line 71, and a second end 725 in alignment with the second end 715 of the aggressor line 71. The first end 713 of the aggressor line 71 is in alignment with the zero point of the one dimension coordinate axis X. A coordinate value of the second end 715 is h. The value h is divided by a number m to get a value s, where m is an integer which is larger than one.

Each of the different positions, whose coordinate value are s, 2s . . . (m−1)*s, of the victim line 72 is linked with a first time delay module 100. Each of the two positions of the aggressor line 71, whose coordinate values are 0 and h, is linked with a sixth time delay module 700, whose delay time is $\tau_d*(m-1)/2$. The above signal transmission lines 70 also reduce crosstalk when signals are transmitted thereon.

In the above embodiments, the time delay modules 100, 102, 200, 500, 600, and 700 on the aggressor line 11, 51, 61, 71 may not be aligned with the time delay modules on the victim line, so that the signal and the crosstalk are asynchronous, thereby reducing the crosstalk.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A pair of signal transmission lines, comprising:
an aggressor line;
a victim line parallel to the aggressor line;
wherein a length of each of the aggressor line and the victim line is h, the aggressor line comprises a first end and a second end, the victim line comprises a first end in alignment with the first end of the aggressor line, and a second end in alignment with the second end of the aggressor line; the aggressor line is placed parallel to a one dimension coordinate axis with the first end of the aggressor line in alignment with a zero point of the coordinate axis; the length h is divided by a number n to get a value s, where n is an odd number equal to or larger than three; three non-negative value a, b, and c, satisfy the following equation: a+b+c=s; each of the different positions of the victim line, whose coordinate value are a+s, a+2s . . . a+0.5*(n−1)*s, a+c+0.5*(n−1)*s, a+c+0.5*(n+1)*s . . . a+c+(n−2)*s, is linked with a first time delay module; and each of the different positions of the aggressor line, whose coordinate value are a and h−b, is linked with a second time delay module, whose delay time is 0.5*(n−1) multiplied by a delay time of the first delay module.

2. The signal transmission lines of claim 1, wherein the delay time of the first delay module is equal to or larger than half of the rise time of a signal transmitted on the aggressor line.

3. A pair of signal transmission lines, comprising:
an aggressor line;
a victim line parallel to the aggressor line;
wherein a length of each of the aggressor line and the victim line is h, the aggressor line comprises a first end and a second end, the victim line comprises a first end in alignment with the first end of the aggressor line, and a second end in alignment with the second end of the aggressor line; the aggressor line is placed parallel to a one dimension coordinate axis with the first end of the aggressor line in alignment with a zero point of the coordinate axis; the length h is divided by a number m to get a value s, where m is an integer which is larger than one; and each of the different positions of the victim line, whose coordinate value are s, 2s . . . (m−1)*s, is linked with a first time delay module; each of the two positions of the aggressor line, whose coordinate values are 0 and h, is linked with a sixth time delay module, whose delay time is (m−1)/2 times of the first time delay module.

4. A pair of signal transmission lines, comprising:
an aggressor line;
a victim line parallel to the aggressor line;
wherein a length of each of the aggressor line and the victim line is h, the aggressor line comprises a first end and a second end, the victim line comprises a first end in alignment with the first end of the aggressor line, and a second end in alignment with the second end of the aggressor line; the aggressor line is placed parallel to a one dimension coordinate axis with the first end of the aggressor line in alignment with a zero point of the coordinate axis; the length h is divided by a number m to get a value s, where m is an even number which is equal to or larger than two; two non-negative values, a and b, satisfy the equation: a+b=s; each of the different positions of the aggressor line, whose coordinate value are a, a+s . . . a+s*(m/2−2), is linked with a fourth time delay module; a position of the aggressor line, whose coordinate value is a+s*(m/2−1), is linked with a third time delay module, whose delay time is half of the delay time of the fourth time delay module; and each of the different positions of the victim line, whose coordinate value are h−b−s, h−b−2s . . . h−b−s*(m/2−1), is linked with the fourth time delay module, and a position of the aggressor line, whose coordinate value is h−b, is linked with the third time delay module.

5. The signal transmission lines of claim 4, wherein the delay time of the third delay module is equal to or larger than half of the rise time of a signal transmitted on the aggressor line.

* * * * *